June 27, 1933.   D. A. CUMFER   1,916,096
APPARATUS FOR MAKING PREPARED SHINGLES
Original Filed Oct. 25, 1926   5 Sheets-Sheet 5
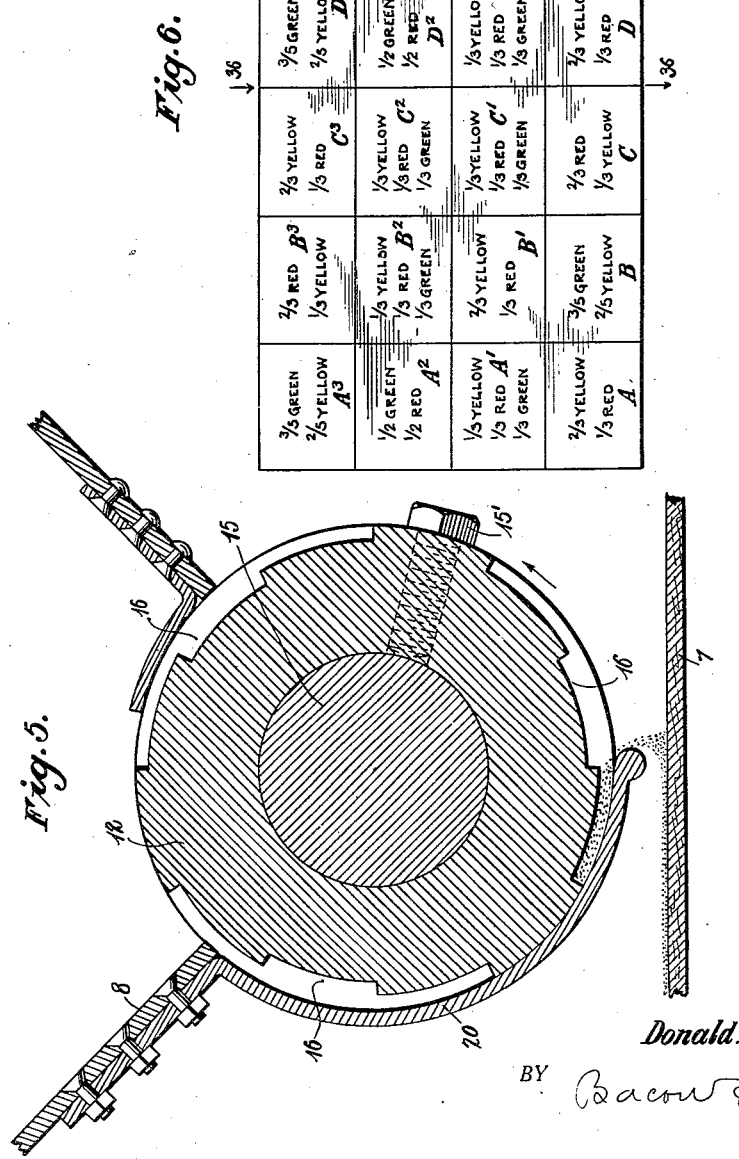
INVENTOR.
Donald A. Cumfer
BY
ATTORNEYS Patented June 27, 1933

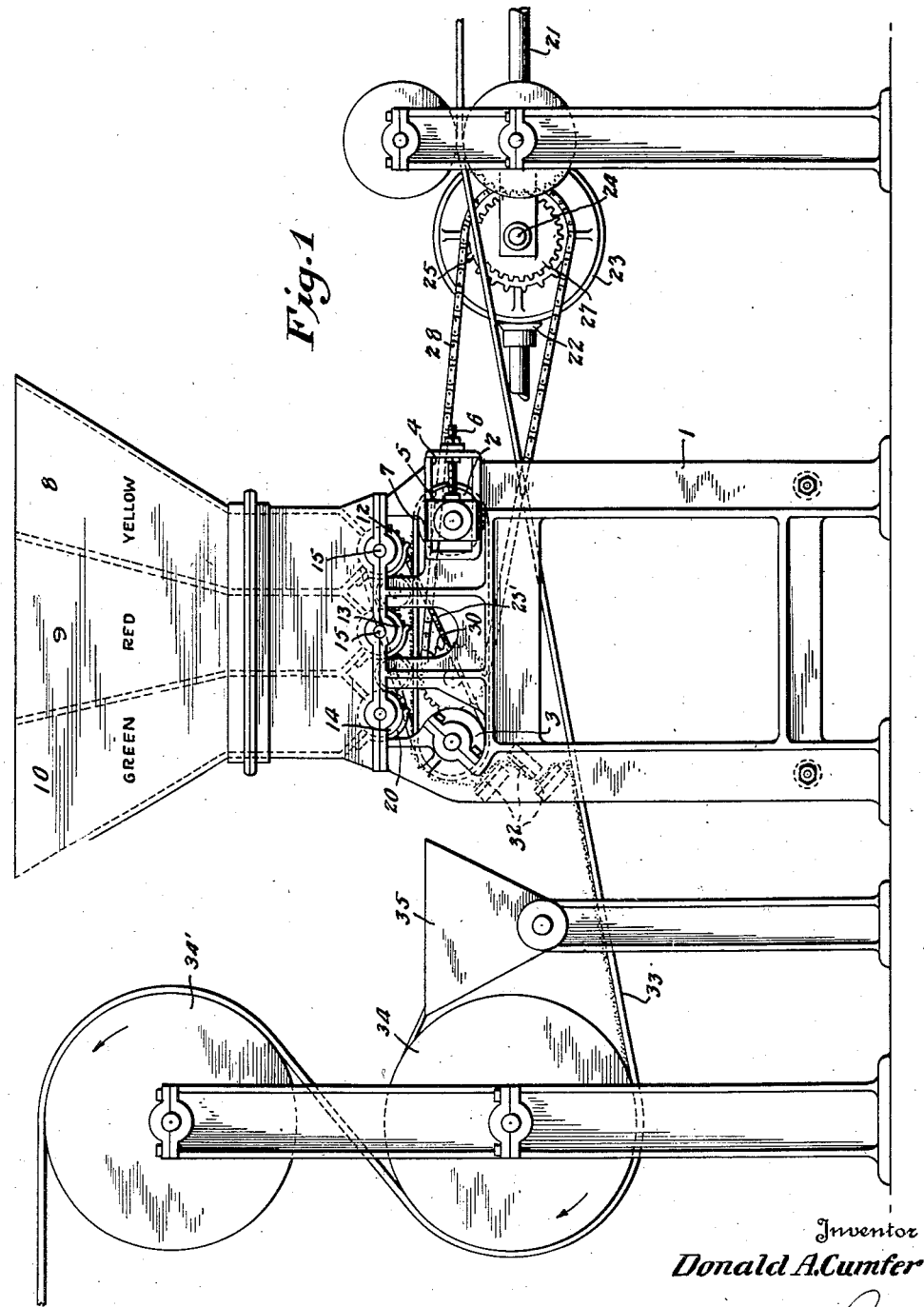

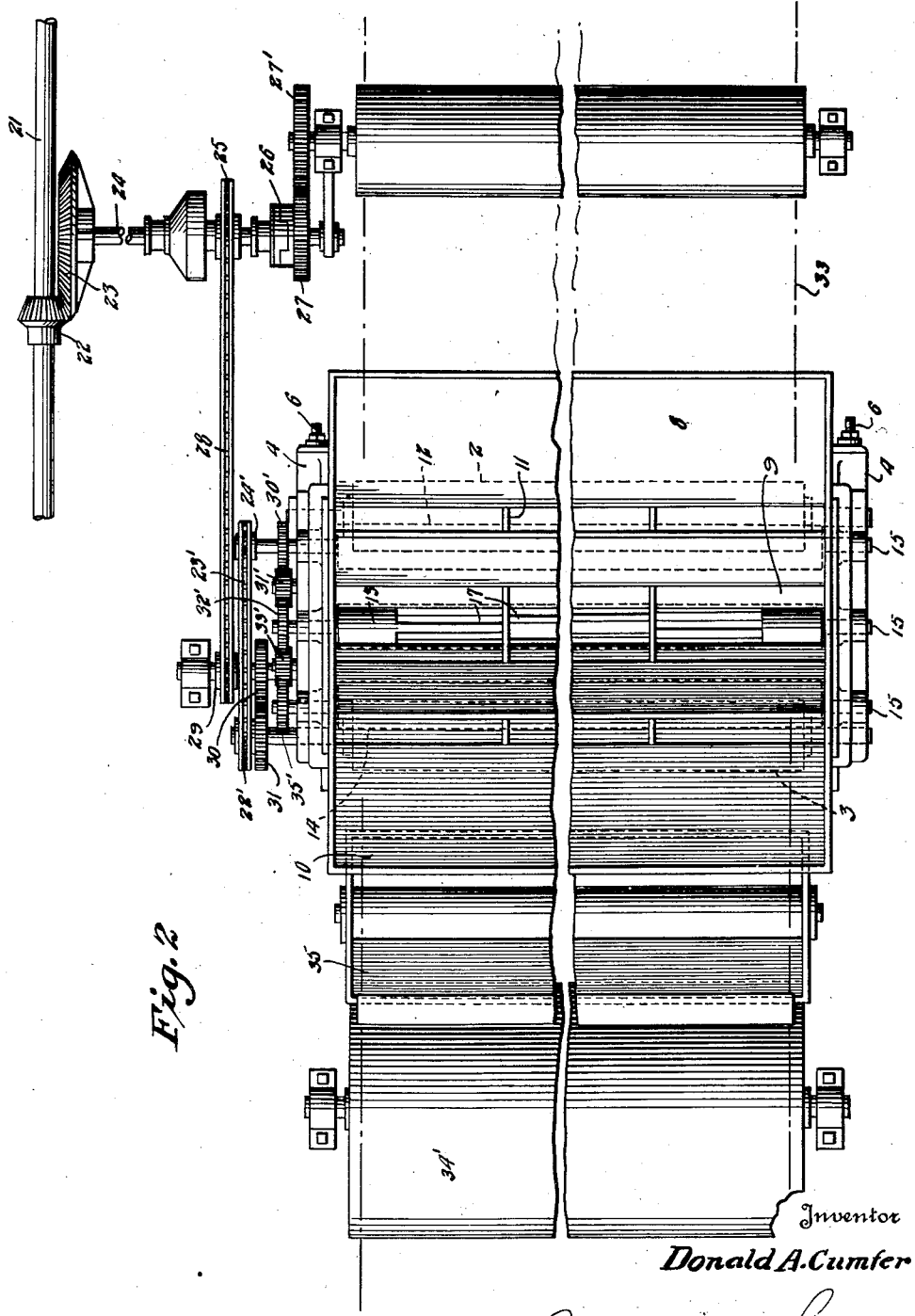

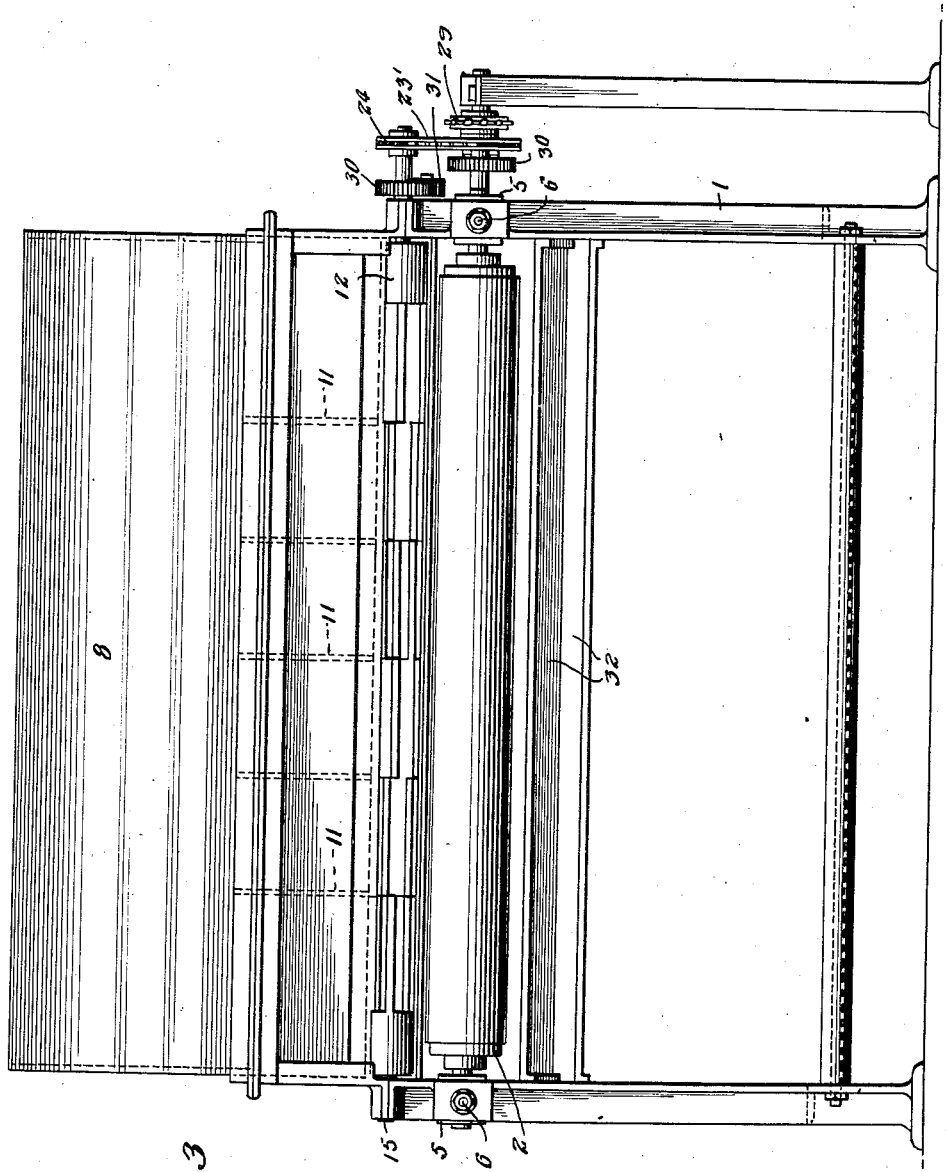

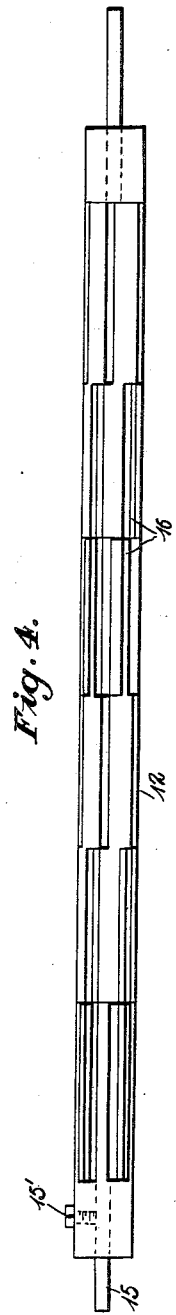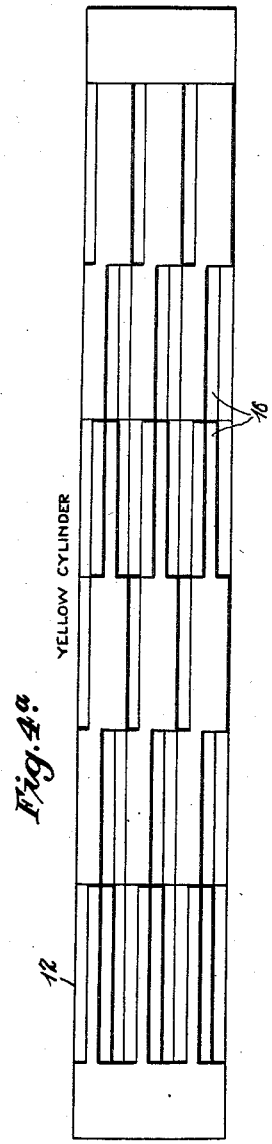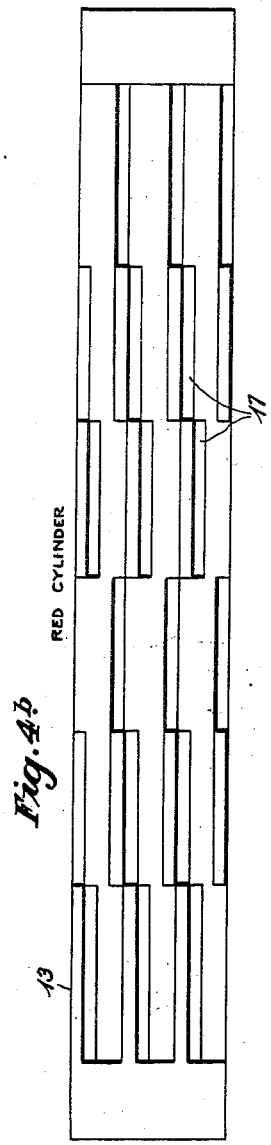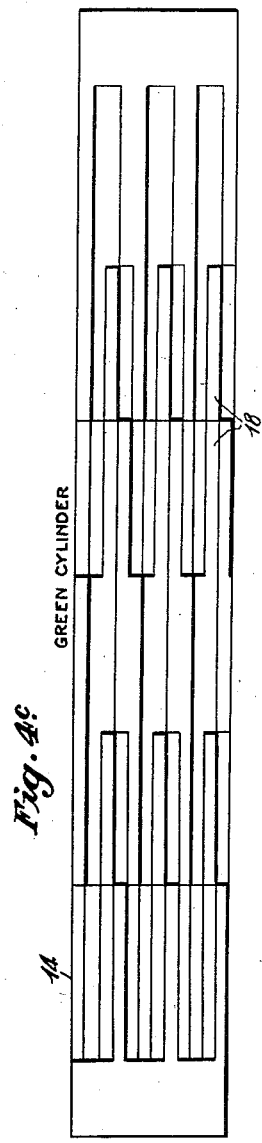

1,916,096

UNITED STATES PATENT OFFICE

DONALD A. CUMFER, OF RUTHERFORD, NEW JERSEY, ASSIGNOR, BY MESNE ASSIGNMENTS, TO THE PATENT AND LICENSING CORPORATION, OF BOSTON, MASSACHUSETTS, A CORPORATION OF MASSACHUSETTS

APPARATUS FOR MAKING PREPARED SHINGLES

Original application filed October 25, 1926, Serial No. 144,128. Divided and this application filed February 23, 1927. Serial No. 170,409.

The invention relates to an apparatus for manufacturing mineral coated prepared roofing.

Prepared roofing of this general type has been extensively used, but because of its dull or monotonous appearance, its use has been more or less confined to inexpensive structures or buildings. This restricted use, however, cannot be attributed to the quality of the roofing, but solely to the flat unvarying and monotonous appearance which has not appealed to the eyes of that portion of the purchasing public who desire roofing structure presenting a most pleasing and ornamental effect so as to be appropriate for use with building structures of the more expensive type.

Many efforts have been made to overcome the foregoing objections without complete success. It has been proposed to manufacture what are commonly known as "color-drift shingles". Under present conditions, such shingles are manufactured by a machine having a partitioned bin for the mineral matter, the partitions in the bin substantially coinciding with the notches in the shingle. In this practice, on a single width machine, where there are three tabs to the strip, each hopper must be filled with three differently mixed charges of slate. The slate to go into each hopper must, therefore, be mixed by hand, before it is placed in the hopper, this operation naturally being a very laborious one. In running the roofing with these three shades, the result is a sheet in which there are three bands or stripes extending lengthwise of the web. The web is cut at the end of the machine into cross cut strips, producing thereby a strip with three differently colored tabs. It will be readily appreciated that if these strips with only three colors were put on a roof of any substantial area, the said three colors would repeat in a mathematical sequence, and the result is that the roof gives a checker-board appearance which is decidedly unsightly. In an effort to overcome this, it has been proposed to run four different or independent stocks in a manner similiar to the above described, in each stock of which the shingle tabs are given different colors, or have the colors placed in different sequence by the proper pre-mixing of mineral matter applied thereto. It has been necessary to run at least four of such stocks, and to then combine them in a regular order so that a finished package will have an irregular sequence of all four of such stocks. It should be borne in mind that in such a practice these four different stocks, of which there are three tabs to each strip, or twelve shingle tabs to the assembly, will have at least six or more colors. It is not a simple matter to produce a desirable color blend effect with such tabs because of the necessity of selecting proper color blends, and also the necessity of arranging the sequences of colors that is necessary to avoid mathematical repetition in colors on the tabs. Such an assembly operation has been exceedingly expensive, and even when carried out to perfection, it does not give the roof the artistic appearance it should have.

It is an object of this invention to provide an apparatus overcoming the foregoing objections by producing mineral coated shingle strips having predetermined areas or tabs thereof coated with predetermined blended minerals in regulated ratios whereby the roofing at all times presents a highly artistic and ornamental appearance. In this apparatus, the minerals of different colors are withdrawn from suitable supplies and combined in measured predetermined quantities to form charges that are thereafter, when in a thoroughly mixed condition, applied to predetermined areas of the roofing material. These successive charges or color combinations vary so that the mineral on one tab or area of the roofing strip is of a shade or appearance properly contrasting with the shade or appearance of the mineral on an adjacent tab.

I have found that the roofing can be given a most artistic and pleasing appearance when a uniform quantity of mineral or grit is applied to each predetermined area or tab of the strip. The mineral applied to each tab is preferably composed of a series of differently colored grits, and to obtain the artistic appearance referred to, the ratio of one colored mineral or grit relative to the ratio of another must be definitely controlled and varied to give the adjacent tabs of a strip contrasting shades properly blending with one another when the roofing is laid. In forming the successive charges of mineral from the variously colored grits, I mix determined and measured quantities of various solid colored minerals, such as red, green, and yellow, in definite varying proportions, which charges are successively formed and progressively applied to predetermined areas of the roofing material.

It is a further object of the invention to provide an apparatus by means of which a wide range in variations in the color combinations may be obtained with a minimum adjustment of the parts of the apparatus. That is to say, the apparatus is one in which the shades or blends of the mineral charges may with ease be varied by changing the quantity of one or more minerals entering said charge to another, which naturally changes the shade of the charge which is to be applied to the tab of a shingle strip.

While the apparatus is particularly useful in the production of a roofing having predetermined areas or tabs covered with suitable blended minerals to give the shades desired, and to distinguish from the dull, monotonous effect obtained by the use of solid colors, it will, of course, be understood that it is entirely within the province of the operator in operating this apparatus to apply charges of blended minerals of predetermined colors to numerous tabs of the roofing material, and to also cover other tabs with the mineral of a solid color should such a color combination be found desirable.

It is a further object of this invention to provide an improved apparatus for measuring the relative quantities of differently colored minerals forming each charge and in successively applying such charges to predetermined areas of the roofing material. This is accomplished by utilizing in the apparatus a plurality of mineral feed rollers having in the periphery thereof pockets of a uniform length and width but varying in depth as well as blank peripheral surfaces. These feed rolls are adjustably mounted so that the pockets or blank surfaces of one feed roll may be adjusted relative to the others to cause the application of predetermined quantities of the variously colored grits to a determined zone on a carrier, which charges are successively formed and of a predetermined shade when mixed, and thereafter are deposited on selected zones or areas of the roofing material in the desired order. It will be appreciated that the feed rolls all rotate in unison and that the relative quantity of one grit with respect to another that is to form a given charge, may be freely varied by a proper adjustment of said feed rolls so as to place the desired pockets of such rolls in properly timed relation with one another, whereby the operation of said rolls causes said selected pockets to deposit the predetermined quantities of grit on a determined area of the carrier, forming a charge giving the selected shade.

The apparatus furthermore embodies other improved mechanical devices and combinations which are novel and which will be more fully hereinafter described.

This application is a division of my application Serial No. 144,128, filed October 25, 1926.

In the drawings,

Fig. 1 represents a side elevation of color machine showing its relative location in a roofing machine.

Fig. 2 represents a plan view of same.

Fig. 3 represents a front elevation of same.

Fig. 4 represents a detail of one of the slate feeding cylinders.

Figs. 4a, 4b, and 4c, represent a diagrammatical development of slate feeding cylinders.

Fig. 5 represents a cross section through a slate feeding cylinder.

Fig. 6 represents a diagrammatical section of roofing showing relative amounts of slate on each area.

Referring now more particularly to the drawings, wherein like reference characters indicate corresponding parts, the numeral 1 designates the base of the apparatus having supporting legs of any convenient type. Near its upper end there is provided a pair of separated rolls 2 and 3. The roll 3 is preferably mounted for rotation in the frame of the machine and is not adjustable. The roll 2, however, is adjustably received in slideways 4 in each side of the machine, the bearing shaft of this roll being supported at each end by blocks 5 which are adjusted by the action of the adjusting screws 6.

Around the rolls 2 and 3 a collector belt 7 passes. This belt is slowly rotated upon a driving operation of the roll 3. Obviously, the rolls are adjusted so as to maintain the belt taut.

This collecting belt or carrier will be more definitely referred to hereinafter.

Disposed on the frame of the machine and above the carrier or collecting belt are a series of hoppers 8, 9, and 10 which extend transversely across the machine and are suitably supported by the legs thereof. These elongated hoppers may each have a series of partitions 11 as shown in Figure 3 to, in effect, divide each hopper into a series of sections. The hoppers 8, 9, and 10 receive batch supplies of differently colored mineral. For instance, the hopper 8 may receive a supply of yellow grit or mineral, the hopper 9 a supply of red, and the hopper 10 a supply of green. These are known as solid colors, it being, of course, apparent that other colored grits can be used, depending upon the character of the roofing strip that is to be produced.

As has been hereinbefore pointed out, it is one of the objects of this invention to provide an apparatus by which roofing material may be produced which has various areas or tabs thereof covered with suitably blended grit or mineral matter so as to give the roofing strip a pleasing and ornamental appearance to and destroy the dull and monotonous appearance so general in prepared roofing. In order to apply to predetermined areas or tabs of the roofing strip differently colored minerals in regulated or determined relative quantities so as to properly shade the resultant composite charge which is to be applied to a given area of the roofing material, feed rolls 12, 13, and 14 are provided, one being disposed at the bottom of each mineral hopper. One of these feed rolls is shown in detail in Fig. 4. Inasmuch as each feed roll is of the same specific construction, a description of one will suffice for all. Each feed roll is adjustably mounted on a driving shaft 15, being retained in its adjusted position by a fastening bolt or screw 15' that passes transversely through a portion of the feed roll and engages the driving shaft. By means of this adjustment any feed roll may be turned to a determined position and retained in such position. Each feed roll tightly fits the bottom of its feed hopper, so that no material can be delivered from a hopper except by its roll. For the purpose of illustrating this invention, each feed roll is provided in its periphery with a series of pockets 16, 17, and 18 respectively, all of different depths and therefore of different capacities. The periphery of each roll also has predetermined blank surfaces. In the showing, three series of the pockets referred to are disclosed, but, of course, this number can be amplified. It will be understood that the depth of the various pockets in each series of the different feed rolls vary, as will more fully be hereinafter pointed out, and it will further be appreciated that the formation of these pockets in a given roller are not uniform across the roll although having substantially the same width and length, but vary beneath various of the partitions 11 for the purpose of applying to the carrier belt on adjacent zones thereof different quantities of grit. Each roll is, of course, removably connected with its supporting shaft and various rolls are available having pockets therein of different and varying depth so that the appropriate roll may be selected, this, of course, depending upon the color combination desired. Each hopper carries a semi-circular guard 20 which extends around the lower portion of the feed roll for the purpose of preventing the discharge of the material contained in any pocket until such pocket passes beyond the end of the guard, at which time the contained material is readily deposited on the advancing carrier belt traveling beneath the pocket.

As before stated, each feed roller is of the same construction with the exception, of course, that the pockets arranged therein may, and generally are, of different capacities or depth in order that the selected quantity of the differently colored minerals may be discharged onto the carrier belt to form a blended charge. For instance, the feed roll 13 will have pockets formed therein in determined sequence to apply the proper quantities of red grit to the carrier belt to commingle or mix with the proper quantities of yellow or green grit which has previously, or will thereafter be applied to a given zone on the belt. This is all a matter of timing, the operator after having worked out a pattern, then merely selects feed rolls having the proper formed pockets and adjusts these rolls on their supporting shafts 15 by the adjusting and retaining pin 15' so that one roll is properly coordinated with another roll whereby the one, two or more rolls will deposit given quantities of differently colored grit on a common zone of the carrier.

All of the feed rolls are adjusted to be driven in unison. The carrier belt operating beneath these rolls is also driven in synchronism with the rolls. Various forms of driving mechanism may be employed, but for the purpose of illustrating this invention, I have shown an aligned shaft 21 carrying a gear 22 meshing with a gear 23 on a shaft 24. The shaft 24 has a sprocket wheel 25 thereon around which a chain 28 passes. This chain also engages a sprocket 29 on a transverse shaft carrying a gear 30 meshing with a gear 31 on the carrier feed roll 3. A clutch mechanism 26 also connects the shaft 24 with a gear 27 that in turn engages a gear 27' on the feed roll for the asphalt coated fabric material to which the mineral matter is to be applied.

To operate the metering or mineral feeding rolls 12, 13, and 14, I provide at one end of the roll 3 a sprocket 22', around which a drive chain 23' passes, this drive chain traveling around a sprocket 24' attached to the shaft of the metering roll 12. This metering roll 12, at its opposite end, also carries a gear 30' meshing with an interposed gear 31', which in turn meshes with a gear 32' mounted on the feed roll 13, while a similar gear 33' transmits the power from the feed roll 13 to a gear 35' on the feed roll 14. In this manner, the feed rolls all operate in the same direction, and, of course, in synchronism. The width and length of the slots in the metering rolls, 12, 13, and 14, are identical, save one inch wider on the ends of the rolls. The speed at which these rolls is driven relative to the speed of the carrier belt is such that as the metering roll advances a width of one inch, the carrier belt advances nine inches. As the carrier belt advances nine inches, the roofing sheet or material passing beneath this belt advances nine inches, which is the determined area to be covered. These relative movements can, of course, all be varied depending upon the type of shingle that is to be manufactured.

The carrier belt 7 passes beneath the feed rolls and the grit or mineral is applied to this belt in predetermined charges covering given areas of the belt. It will be appreciated, of course, that the adjacent zones or areas of this belt receive charges of differently blended minerals. One charge may consist of ⅔ red mineral with ⅓ yellow, while an adjacent charge may contain ⅓ red and ⅔ green, depending upon the color combinations selected. However, these charges are formed on the collector belt and when the collector belt reaches the pulley 3 the mineral matter cascades over the baffles 32 wherein a thorough intermixing of the differently colored minerals forming each charge occurs without causing a substantial intermixing of the mineral constituting adjacent charges.

A strip of fibrous material such as commonly used in the manufacture of prepared roofing runs beneath the baffles 32. This strip is represented by the reference character 33. It is impregnated and coated with an adhesive material such as asphalt, bitumen, etc., and onto this adhesive surface the charges of mineral matter are deposited. If, for example, the pockets in the roll are say, one inch wide, the relative speeds are so controlled that when the peripheral travel of a metering roll is one inch, the carrier belt will have traveled nine inches, and the roofing sheet will have traveled nine inches. In this way, regardless of the speed of the sheet, the metering and deposition of slate, in accordance with a predetermined color blend pattern, may be accomplished. The speed of the various parts of the apparatus and the movement of the roofing strip 31 are so timed that a charge of a determined area on the carrier belt 7 will cover a predetermined zone of the roofing strip, or in common practice will cover a tab which may be 12″ x 9″ in area. The mineral matter so applied is of the desired shade by reason of the fact that it is composed of determined quantities of the differently colored minerals from the hoppers 8, 9 and 10. The roofing strip, after receiving this mineral, passes on around a suitable sanding unit embodying the rolls 34 and 34′, and thence to the suitable severing apparatus where the sheet is cut into strips, each strip preferably embodying three tabs. Any loose grit is picked up at the sanding unit and deposited into the hopper 35 from where such grit is collected and may be again used in any approved manner.

As will be clearly appreciated, the process herein involved is one by which roofing material is produced wherein the various tabs thereof are coated with grit or mineral matter of different colors in predetermined relative quantities. It will be furthermore understood that the adjacent tabs, for instance, of a roofing strip, have different shades so as to destroy any dull or monotonous effect. In Fig. 6, I have shown diagrammatically the surface of a section of a roofing strip produced by this operation. In this diagram the tabs A, A′, A$^2$, and A$^3$, of course, all have received grit charges that have been formed and placed on the carrier belt 2 by the action of the feed rolls between a pair of the baffles 11. Likewise, the tabs B, B′, B$^2$, and B$^3$, all have received mineral charges that were deposited on the carrier belt by pockets in the feed rolls disposed between an adjacent pair of said baffles 11 and the same applies as to the tabs C to C$^3$, D to D$^3$, E to E$^3$, and F to F$^3$. In this embodiment of the invention, the roofing sheet is of sufficient width to provide six tabs thereon or two strips, as each strip contains three tabs when the sheet is cut by severing mechanism known in the art. The arrows 36 indicate the direction of movement of the sheet through the machine. It is, of course, understood that each tab of predetermined area of the roofing strip receives a certain definite minimum quantity of mineral matter, this being a matter of calculation, to assure the adequate covering of the surface of the tab. All of the tabs must receive this total amount of grit or mineral matter, but the proportions of one colored mineral relative to another applied to the adjacent tabs will vary. In the diagrammatic showing, the tab A$^3$ has been covered with a charge of grit, ⅗ of which is green in color and ⅖ yellow. Assuming that the total depth of a pocket formed in one of the feed rolls must be .33″, to provide the amount of grit necessary to cover an area of say 12″ wide x 9″ long, the rolls will have been so timed and adjusted that the green roll 14 will have a pocket of .199″, depositing this quantity of green slate or mineral on an area or zone of the carrier belt that has already received from a suitably sized pocket in the yellow feed rolls 12, .132″ of yellow grit or mineral matter. The tab marked A$^2$ in the diagrammatic view has received a charge of mineral matter containing ½ a green colored mineral and ½ a red colored mineral. This means that the operator has adjusted his rolls so that at the time a given zone or area of the carrier belt is to receive this charge, a pocket in the red roller 13 of a capacity of .166″ deposits its charge on this carrier, while at the time this charge reaches the green roll 14 a pocket in this roll of 0.166″ passes from beneath the guard 20 and drops this mineral on the zone that had received the red charge. During the time that this zone of the carrier or belt passed beneath the yellow feed roll 12, one of the blank or unbroken spaces 19 of this feed roll is passing around the guard 20, prohibiting the application of any of the yellow grit to the zone or area of the carrier that received the charge subsequently applied to the tab A². The same operation occurs in the measuring of the various charges to be applied to all of the other tabs of the roofing sheet. The feeding rollers are all adjusted after a color combination has been selected by the manufacturer so that the roofing strip will receive the various charges of differently colored mineral grit to be applied to predetermined zones or tabs of this sheet so that the adjacent tabs or zones are properly shaded.

Fig. 5 diagrammatically discloses the action of the feeding rolls, and represents the dimensions of the successive pockets of the three feed rolls 12, 13, and 14 entirely across each roll to produce a roofing sheet wherein the tabs receive charges containing ratios of differently colored minerals as shown in Fig. 6. In this chart, A' represents the mineral matter fed by the green and yellow rolls to cover the tab designated by reference character A in Fig. 5. A³ likewise represents the capacity of the pocket feeding the green and yellow grit or mineral matter to form the charge covering the tab A². The tab A', as shown in Fig. 5, has received a mineral charge containing certain quantities of yellow, green, and red grit. By referring to the diagrammatic chart in Fig. 6, it will be seen that the feed rolls 12, 13, and 14 all have pockets of .111" which deposit the desired quantity of grit in super-imposed layers on a given zone of the carrier belt during the advancing of this zone through the machine. As before stated, when a color combination has been designed which has a pleasing appearance, then the feed rolls are selected and adjusted so that the pockets formed therein are of sufficient depth to produce the charges desired, and are so timed as to deposit the contents of each pocket on the proper area or zone of the carrier belt as it is advancing through the machine.

Fig. 6 furthermore contains reference characters B to B³ inclusive to F to F³ inclusive, and such reference characters correspond with the reference characters applied to the tabs shown in Fig. 5. For instance, to produce the charge of ⅔ red and ⅓ yellow for the tab B, the feed roller 12 for the hopper 8 has a pocket of .111" depth discharging its contents at a predetermined time to a determined zone or area of the carrier belt, which belt then advances beneath the roll 13, at which time a pocket in this roll of .222" discharges its contents of red mineral matter on this zone, the carrier belt then advancing around the drive roll 3, but receives no mineral matter from the feed roll 14, inasmuch as an unbroken portion of this feed roll is traveling around the guard 20 when this predetermined area of the carrier belt passes beneath this roll. It will be understood that in the illustration herein given, it has been assumed that a pocket having a total depth of .333" is necessary to apply the proper amount of grit to cover one of the tabs, but, of course, this selection has been made merely for the purpose of illustrating this invention, and can be changed at will.

It will also be appreciated that the color combinations, as herein shown, are subject to change at any time. Regardless of the color combinations used, it will be apparent that charges containing regulated quantities of one colored grit relative to another can be successively formed from batch supplies of differently colored minerals and thereafter applied when in a thoroughly intermixed condition to determined tabs or zones of a roofing sheet so as to give such tabs a proper and variable shade, destroying the dull and monotonous appearance, incident to the use of solid colors. The relative quantities of the differently colored grits forming each charge are subject to instant change, permitting the apparatus to produce roofing material in which the tabs are covered with grit charges of various patterns and wherein the charges applied to one tab properly contrast with the charges applied to an adjacent tab.

It will be appreciated that the pockets 16, 17, and 18 formed in the various feeding rollers generally are of the same length and width. However, as is clearly apparent, the pockets in the various rolls will vary in depth. I propose to utilize liners or fillers to be inserted in the various pockets in the feed rolls by means of which the carrying capacity of each pocket can be varied to produce any desired number of color combinations. These liners will naturally change the depth of a pocket, and by keeping available a substantial number of liners of various depths, a multitude of color combinations can be effected with the use of a minimum number of rollers.

In this specification, I have disclosed metering rolls for measuring the quantities of material deposited on the carrier belt. It will be, of course, understood that it is within the scope of this invention to use any suitable measuring devices by means of which definite quantities of minerals could be deposited on the carrier belt within certain limits of accuracy.

Having thus described my invention, what I claim is:

1. In a machine of the character described, the combination with a carrier, a series of receivers each adapted to receive comminuted mineral matter, a measuring device cooperating with each receiver, means for actuating said carrier and said measuring devices to deposit on predetermined zones of said carrier charges containing definite relative quantities of minerals withdrawn from said receivers, means for agitating the minerals forming each charge, and means for advancing a strip of roofing material, to receive successive charges of the intermixed grits on predetermined zones thereof whereby adjacent zones are coated with mineral matter of contrasting colors.

2. In a machine of the character described, the combination with a carrier, of means for moving the carrier, mechanism for depositing on predetermined zones of said carrier regulated quantities of mineral matter, means for advancing a roofing sheet strip, and means for depositing said charges from the carrier on predetermined zones of the roofing sheet.

3. In a machine of the character described, the combination with a movable carrier, a plurality of receivers, measuring devices for controlling the discharge of material from each receiver, means for operating said carrier and said measuring devices to deposit definite quantities of material from said receivers on determined zones of said carrier, means for passing a roofing strip adjacent the carrier, and means for directing said charges from the carrier on predetermined zones of said roofing strip.

4. An apparatus for coating roofing comprising, in combination, means for advancing the roofing base, a plurality of receivers each adapted to contain different characters of surfacing materials, metering devices cooperating with the receivers, means for operating the metering devices concurrently with the travel of the base to withdraw the surfacing minerals to form successive charges to be cyclically applied to the advancing base and means for effecting a thorough intermixture of the surfacing materials constituting the charges prior to their application to the advancing base.

5. An apparatus for surfacing roofing comprising, in combination, means for continuously advancing a roofing base, a series of receivers each adapted to receive different kinds of surfacing materials, metering devices cooperatively arranged with respect to the receivers, and means for actuating said metering devices to separately withdraw the said surfacing materials and means for thoroughly intermixing and combining the same to form charges to be successively applied to the advancing roofing.

6. An apparatus for surfacing roofing materials, comprising, in combination, means for continuously advancing a roofing base, a series of receivers each adapted to contain different characters of surfacing minerals, metering devices cooperatively associated with said receivers, means for actuating said metering devices in timed relation to the advancement of the roofing base, said metering devices being provided with means for continuously varying the relative quantities of minerals withdrawn, to thereby cyclically change the color of the succeeding charges deposited on the base.

7. In an apparatus of the class described, in combination, means for continuously advancing a roofing base, a series of receivers each adapted to contain differently colored mineral grits, metering rollers associated with each of said receivers, said metering rollers being provided with means to continually vary the ratio of the minerals withdrawn from one of the receivers relative to the others to thereby continuously vary the composition and color of the successive charges of minerals applied to the advancing base.

8. An apparatus for surfacing roofing material comprising means for advancing the roofing materials, a plurality of receivers each adapted to contain differently colored minerals, a series of metering rollers operatively associated with the receivers, said metering rollers having varying withdrawal capacities, means for actuating said metering rollers in timed relation to the advancement of the roofing strip for continuously effecting the formation of charges of continuously varying composition to be applied to successive areas of the advancing sheet.

9. An apparatus for surfacing roofing strips comprising, in combination, means for continuously advancing the roofing strip, a plurality of sources of supply for differently colored minerals, means for withdrawing streams of minerals from the sources of supply and effecting their thorough admixture substantially as withdrawn to form successive charges to be cyclically applied to successive areas of the advancing strip.

10. An apparatus for coating roofing strips comprising means for advancing the roofing strip, a plurality of sources of supply for differently colored minerals, means for withdrawing streams of such minerals and means for thoroughly intermixing in cyclically varying quantities of said minerals to form successive charges of different colors and applying said charges to the advancing strip.

11. An apparatus for coating roofing strips in combination, means for advancing the roofing strip, a plurality of sources of supply for different characters of surfacing materials, means operable in timed relation to the advancement of the strip to withdraw measured quantities of said minerals and thereafter effect their mixture, substantially as withdrawn and means for depositing such charges on the advancing strip.

12. An apparatus for coating roofing strips comprising, in combination, means for continuously advancing the roofing strip, a plurality of sources of supply for different characters of surfacing materials, metering devices operable in timed relation to the advancement of the strip for withdrawing measured quantities of said surfacing materials to form charges to be applied to successive zones of said strip, said metering devices being constructed to continuously vary the relative quantities of the withdrawn surfacing materials to thereby cyclically change the color of the charges applied to the advancing strip.

13. An apparatus for surfacing roofing materials comprising, in combination, means for advancing a sheet of roofing material, a series of hoppers each adapted to contain different characters of surfacing materials, a series of cooperating metering rollers for withdrawing predetermined measured quantities of the surfacing materials in timed relation to the advancement of the roofing strip, said metering rollers having pockets of varying capacities arranged in predetermined relative positions whereby to continuously vary the relative quantities of the withdrawn surfacing materials to form charges of continuous varying qualities.

14. An apparatus for surfacing roofing materials comprising means for advancing a roofing sheet, a plurality of containers each adapted to contain different characters of surfacing minerals, said hoppers being arranged over the advancing strip, a series of metering devices cooperatively arranged with respect to the hoppers, said metering devices being constructed to continuously vary the ratio of the withdrawn grits relative to one another to thereby cyclically change the color of the succeeding charges successively deposited on succeeding predetermined areas of the advancing strip.

15. An apparatus for surfacing roofing strips comprising, in combination, means for continuously advancing a strip of material to be coated, a plurality of receivers each adapted to contain surfacing grits of different characteristics, a series of metering rollers operatively associated with the receivers, means for driving said metering rollers in unison with the advancement of the strip, said metering rollers being adapted to continuously vary the quantity of material withdrawn from one of the hoppers of the receptable relative to the others to thereby continuously change the composition of the successive charges applied to the advancing strip, said metering rollers being adjustable with one another whereby to selectively change the desired surfacing pattern.

16. An apparatus for manufacturing roofing, comprising means for continuously advancing a roofing sheet, a plurality of sources of supply for differently colored minerals, and means for withdrawing varying quantities of said minerals and means for effecting a predetermined mixture thereof before application to the advancing sheet, said first named means being adjustable to change the ratio of the succeeding withdrawn charges to thereby form zones of different shades on the advancing strip.

17. An apparatus of the class described comprising, in combination, means for advancing a strip of roofing material, a series of receivers positioned above said advancing strip, each of said receivers adapted to contain differently colored granules, metering devices cooperatively associated with the receivers for withdrawing predetermined measured ratios of the said minerals to form successive charges adapted to be continuously applied to the advancing strip, a carrier belt for receiving the charges and depositing the same on the roofing strip, said carrier belt, sheet advancing means, and metering devices, being operated in timed relation.

18. An apparatus for coating roofing strips comprising means for continuously advancing a strip to be coated, a series of hoppers for receiving different characters of minerals, metering devices associated with said hoppers, said metering devices having pockets of differential capacities, for withdrawing predetermined relative quantities of minerals from the different hoppers to form charges to be successively applied to succeeding zones of the advancing strip, said metering devices constantly changing the withdrawn quantities of the materials from some of the hoppers relative to others to thereby continuously change the color of the successive coated zones on the strip.

19. In an apparatus for producing mixtone effects on roofing, in combination, means for advancing the roofing base, a plurality of sources of supply for different characters of surfacing materials, means for withdrawing streams of minerals from said sources of supply and effecting their thorough admixture to form a charge of a given character and means for cyclically changing the composition of the succeeding charges applied to the roofing whereby to continuously change the appearance of the successive charges.

20. In an apparatus for producing mixtone effects on roofing, in combination, means for advancing the roofing base, a plurality of sources of supply for different characters of surfacing materials, means for withdrawing streams of minerals from said sources of supply and effecting their thorough admixture to form a charge of a given character and means for cyclically changing the composition of the succeeding charges applied to the roofing whereby to continuously change the appearance of the successive charges, and means for predetermining the composition of the cyclic charges applied to the roofing.

21. In an apparatus for surfacing roofing, in combination, means for advancing a roofing base, a plurality of sources of supply for containing differently colored mineral grits, means for withdrawing streams of said grits from the sources of supply and superimposing them upon one another to form a charge of predetermined composition, means for applying the intermixed charge to the roofing base and means for cyclically changing the composition of the successive charges applied to the roofing base.

22. In an apparatus for surfacing roofing in combination, means for advancing a roofing base, a plurality of sources of supply for containing differently colored mineral grits, means for withdrawing streams of said grits from the sources of supply and for thoroughly intermixing substantially all particles of the grits constituting said streams to form a charge of predetermined composition, and for applying such charge to the advancing roofing base and means for cyclically changing the composition of the successive charges applied to the roofing base.

23. In an apparatus for producing mixtone effects in roofing surfaced with contrasting granules, the combination with a series of supply chambers each adapted to receive granules of a given color, means for withdrawing intermittently, in metered quantities, streams of granules from said supply chambers, mechanism for intermixing the differently colored granules after such withdrawal, means for cyclically varying the proportions of granules withdrawn from said supply chambers, and means for applying the withdrawn granules to a sheet of roofing material.

24. In an apparatus for manufacturing mineral coated roofing materials, the combination with a plurality of supply chambers each adapted to receive bulk supplies of differently colored granules, means for discharging streams of contrasting granules from said bulk supplies in metered quantities to form charges, means for mixing the granules forming each charge after withdrawal from said bulk supplies, and means for applying said admixed granules to a sheet of roofing, and means for cyclically varying the proportions of granules drawn from said bulk supplies to form succeeding charges of contrasting color.

25. Apparatus of the character described comprising supply sources for contrasting roofing surface granules, means for receiving and combining the granules from said sources, and valvular means for cyclically varying the flow of the different granules to said receiving and combining means, and thus the proportions of the different granules in the combination.

26. An apparatus for producing cyclical mixtone effects on roofing surfaced with contrasting granules, comprising means for advancing the roofing base, a plurality of sources of supply for receiving differently colored granules, means for releasing granules from said sources of supply and effecting their intermixture as they are supplied to the advancing roofing base, said means operable in synchronism with the advancement of the belt to cyclically vary the proportions of the released granules.

27. An apparatus for surfacing roofing comprising in combination means for continuously advancing a roofing base, a series of receivers each adapted to receive different kinds of surfacing materials, metering devices cooperatively arranged with respect to the receivers, and means for actuating the metering devices to separately withdraw the surfacing materials and means for thoroughly intermixing and combining the same to form charges of a single unbroken stream composed of a mixture of definite composition, to be successively applied to the advancing sheet.

28. In an apparatus for producing mixtone effects in roofing surfaced with contrasting granules the combination with a series of supply chambers each adapted to receive granules of a given color, means for withdrawing, intermittently, in metered quantities, charges of granules from said supply chambers, mechanism for intermixing the differently colored granules after such withdrawal, means for cyclically varying the proportions of the granules withdrawn from said supply chambers, mechanism for moving the run of roofing to receive the charges of varying proportions, said withdrawing means being driven by and operable in synchronism with the advancing means for the roofing.

29. An apparatus for surfacing roofing comprising, in combination, means for advancing a roofing base, a series of receivers adapted to receive different kinds of surfacing materials, means for withdrawing surfacing materials from said receivers and means for thoroughly intermixing and combining the materials to form a charge composed of a mixture of predetermined composition to be applied to the advancing roofing base.

30. An apparatus for producing mixed tone effects in roofing surfaced with contrasting granules comprising, in combination, a plurality of receptacles adapted to contain differently colored granules, means for discharging metered quantities of the granules from said receptacles, means for intermixing said granules after withdrawal from the receptacles to form a charge of predetermined composition and means for applying the same to a sheet of advancing roofing.

31. An apparatus for producing cyclical mixed tone effects on roofing which comprises means for intermixing contrasting granules as they are supplied to a run of roofing, and means for cyclically varying the proportions thereof.

32. An apparatus for manufacturing contrasting zoned mineral surfaced roofing, comprising means for advancing a sheet of roofing, means for metering surfacing material in quantities sufficient to cover a predetermined area of said roofing sheet, means for continuously varying the composition of the succeeding charges concurrently with the travel of the sheet, and means for depositing such charges on succeeding predetermined areas of the base.

33. An apparatus of the character described comprising supply sources for contrasting roofing surface granules, means for advancing a roofing web, the supply sources being disposed transversely with respect to the advancing width, means for withdrawing and combining granules from said surfaces and thoroughly intermixing the same to form charges of definite composition, and means for applying said charges in parallel lanes upon the advancing strip.

34. An apparatus of the character described comprising supply sources for contrasting roofing surface granules, means for simultaneously combining granules from said sources and interadmixing the same to form charges of definite, predetermined composition, and means for applying said charges in parallel lanes upon an advancing web of roofing material.

35. An apparatus of the character described comprising supply sources for contrasting roofing surface granules, means for simultaneously combining granules from said sources and interadmixing the same to form charges of definite, predetermined composition, means for applying said charges in parallel lanes upon an advancing web of roofing material, and means for cyclically changing the composition of the charges as the strip is advancing.

36. An apparatus of the character described comprising supply sources for contrasting roofing surface granules, means for advancing a web of roofing of sufficient width to be subdivided longitudinally to provide a plurality of shingle strips, means for simultaneously withdrawing granules from the supply sources and thoroughly interadmixing the same to form charges of definite composition and means for applying said charges in parallel lanes upon the advancing roofing web whereby to form upon said web transverse areas of predetermined apparatus.

37. An apparatus for manufacturing granular surfaced roofing comprising a plurality of series of separate receptacles containing supplies of differently colored granules, means for feeding a roofing web thereunder, means for simultaneously discharging from several supplies in each series of receptacles predetermined proportions of granules therefrom to form a plurality of streams, each stream being of determined composition and the composition of one of said streams differing at times from the composition of another of said streams, means for periodically varying the proportion of the granules withdrawing from said separate receptacles, and means for continuously depositing said streams upon said traveling roofing web.

In testimony whereof I affix my signature.

DONALD A. CUMFER.